US010691902B2

(12) United States Patent
Guzik

(10) Patent No.: US 10,691,902 B2
(45) Date of Patent: Jun. 23, 2020

(54) DEVICE CONTROL USING ENTITY IDENTIFIERS

(71) Applicants: WHP WORKFLOW SOLUTIONS, INC., North Charleston, SC (US); GETAC TECHNOLOGY CORPORATION, Taipei (TW)

(72) Inventor: Thomas Guzik, Edina, MN (US)

(73) Assignees: WHP Workflow Solutions, Inc., North Charleston, SC (US); Getac Technology Corporation, Taipei (TW)

(*) Notice: Subject to any disclaimer, the term of this patent is extended or adjusted under 35 U.S.C. 154(b) by 0 days.

(21) Appl. No.: 15/582,578

(22) Filed: Apr. 28, 2017

(65) Prior Publication Data

US 2018/0314861 A1    Nov. 1, 2018

(51) Int. Cl.
*G07F 7/08* (2006.01)
*B60R 25/04* (2013.01)
*G06K 1/12* (2006.01)
*G06F 16/38* (2019.01)
*G06Q 50/26* (2012.01)

(52) U.S. Cl.
CPC .......... *G06K 1/128* (2013.01); *G06F 16/381* (2019.01); *G06Q 50/265* (2013.01)

(58) Field of Classification Search
CPC ................................ G06K 1/128; H04L 63/08
See application file for complete search history.

(56) References Cited

U.S. PATENT DOCUMENTS

| 7,755,482 B2* | 7/2010 | Hubbard ............. G06Q 10/08 |
| | | 235/385 |
| 8,606,293 B2 | 12/2013 | Kim et al. |
| 9,240,984 B2* | 1/2016 | Thielen ............. G06F 9/4411 |
| 2005/0021289 A1* | 1/2005 | Robertson .......... G06F 11/3696 |
| | | 702/182 |
| 2009/0251545 A1* | 10/2009 | Shekarri ............. G06Q 10/00 |
| | | 348/158 |
| 2011/0018998 A1* | 1/2011 | Guzik .................. H04N 21/21 |
| | | 348/143 |
| 2012/0225635 A1 | 9/2012 | Esbensen |

(Continued)

OTHER PUBLICATIONS

International Search Report and Written Opinion for PCT Application No. PCT/US2018/029485, dated Aug. 10, 2018, 13 pages.

(Continued)

*Primary Examiner* — Joseph H Feild
*Assistant Examiner* — Pameshanand Mahase
(74) *Attorney, Agent, or Firm* — Han Santos, PLLC

(57) ABSTRACT

Techniques for efficiently and automatically activating portable devices include a device nomenclature schema used to associate devices with particular entities, including a person, a group of persons, a role, a location, a type, etc. A first device can be configured to activate one or more other devices according to assigned entity names when certain conditions occur. When a recording event occurs, metadata associated with one or more recording devices is stored, including entities that were activated during the recording event. A reviewer of the event recording can thereby easily determine other devices that might have stored data related to the event.

23 Claims, 9 Drawing Sheets

(56) References Cited

U.S. PATENT DOCUMENTS

2013/0160104 A1\* 6/2013 Carlson .................. G06F 21/31
726/7
2014/0369188 A1 12/2014 Seleznyov
2015/0050003 A1 2/2015 Ross et al.
2016/0283699 A1\* 9/2016 Levin .................. G06F 21/6218
2016/0364687 A1\* 12/2016 Matson ................ G06Q 10/087

OTHER PUBLICATIONS

Taiwanese Application No. 107114434, Office Action, dated Mar. 19, 2019, 7 pages.
Taiwanese Application No. 107114434, Search Report, dated Mar. 11, 2019, 1 page.

\* cited by examiner

|   | 1 | 2 | 3 | 4 | 5 | 6 | 7 |
|---|---|---|---|---|---|---|---|
|   | DEVICE | ID | Group | Subgroup | Type | Role | Location |
| A | CC0101 | JStevens | Patrol | SE | Car Cam | Officer | 44.476457, 93.361816 |
| B | BC325A | JStevens | Patrol | SE | Body Cam | Officer | 44.476457, 93.361816 |
| C | SC772F | F0001 | Zone 8 | SE | Fixed Cam |  | 4th Ave., 1400 block |
| D | CC2234 | BJones | Patrol | SE | Car Cam | Lead | 44.894559, 93.311267 |
| E | BC944D | BJones | Patrol | SE | Body Cam | Lead | 44.894559, 93.311267 |
| F | LB1129 | JStevens | Patrol | SE | Light Bar | Officer | 44.476457, 93.361816 |
| G | BS4665 | JStevens | Patrol | SE | Body Sensor | Officer | 44.476457, 93.361816 |
| H | LB284D | BJones | Patrol | SE | Light Bar | Officer | 44.894559, 93.311267 |
| I | SC772F | F0002 | Zone 8 | SE | Fixed Cam |  | 44.454590, 93.341671 |
| J | CC2234 | TSmith | Patrol | NE | Car Cam | Officer | 45.1234567, 93.36789 |
| K | BC944D | TSmith | Patrol | NE | Body Cam | Officer | 45.1234567, 93.36789 |

FIG. 2

|   | 1 | 2 | 3 | 4 | 5 | 6 | 7 |
|---|---|---|---|---|---|---|---|
| A | ID | DEVICE | Group | Subgroup | Type | Role | Location |
| B | BJones | CC2234 | Patrol | SE | Car Cam | Lead | 44.894559, 93.311267 |
| C | BJones | BC944D | Patrol | SE | Body Cam | Lead | 44.894559, 93.311267 |
| D | BJones | LB284D | Patrol | SE | Light Bar | Officer | 44.894559, 93.311267 |
| E | F0001 | SC772F | Zone 8 | SE | Fixed Cam | | 4th Ave., 1400 block |
| F | F0002 | SC772F | Zone 8 | SE | Fixed Cam | | 44.454590, 93.341671 |
| G | JStevens | CC0101 | Patrol | SE | Car Cam | Officer | 44.476457, 93.361816 |
| H | JStevens | BC325A | Patrol | SE | Body Cam | Officer | 44.476457, 93.361816 |
| I | JStevens | LB1129 | Patrol | SE | Light Bar | Officer | 44.476457, 93.361816 |
| J | JStevens | BS4665 | Patrol | SE | Body Sensor | Officer | 44.476457, 93.361816 |
| K | TSmith | CC2234 | Patrol | NE | Car Cam | Officer | 45.1234567, 93.36789 |
| L | TSmith | BC944D | Patrol | NE | Body Cam | Officer | 45.1234567, 93.36789 |

DEVICE CONTROL USING ENTITY IDENTIFIERS

BACKGROUND

Law enforcement agencies provide officers and agents with an assortment of devices—electronic and otherwise—to carry out duties required of a law enforcement officer. Such devices include radios (in-vehicle and portable), weapons (guns, Tasers, clubs, etc.), body-worn audio/video recorders, portable computers, and the like. In addition, vehicles such as cars, motorcycles, bicycles, Segways, etc., are typically equipped with electronic devices associated with the vehicle, such as sirens, beacon lights, spotlights, personal computers, etc.

It is increasingly common for law enforcement agencies to require officers to activate cameras (body-worn and vehicle mounted) that enable officers to record audio and/or video of incidents in which an officer is involved. This provides a way to preserve evidence, that would otherwise be unavailable, for subsequent legal proceedings. A lack of such evidence could make it difficult or impossible to investigate criminal activities, identify perpetrators of crimes, examine allegations of police misconduct, etc. But there are times when an officer fails to or is unable to activate a camera to record an incident. Valuable evidence, then, can be lost.

It is also desirable in many circumstances that devices are used in certain ways when particular actions occur. For instance, in a situation where an officer detects gunshots fired, it may be desirable to activate a device to alert nearby officers to come to the vicinity where the shots were detected. Usually, the officer detecting the shots fired will use a device, such as a radio, to notify nearby officers of the situation. But in some instances, the officer is unable to perform such a task.

SUMMARY

Described herein are techniques for efficiently and automatically activating portable devices used by law enforcement officers to take appropriate actions at appropriate times. A device nomenclature schema is used to associate electronic devices with particular entities, including but not limited to, an officer's name, a group of officers, an officer's role (e.g., lead or supervisor), a device location (which may be an officer's location), a device type (body worn camera, car mounted camera, etc.), and the like. Doing so allows efficient selection of a particular group of devices to be activated by indication of the entity name.

In addition, use of such techniques allows a first device to activate one or more other devices according to programmed entity names when certain conditions occur. For example, rather than a device or a remote controller simply transmitting a beacon to activate all devices when a particular situation occurs, the device and/or remote controller can be configured to, for example, only transmit an activation signal to devices associated with a particular entity and/or only within a certain range of the first device. This intelligently limits a number of devices that are activated by the first device in certain situations.

One or more techniques are also described that provide for a portable device check-out and check-in procedure. When an officer checks out a portable device, the portable device is assigned to that officer, while at the same time, the portable device is registered to one or more entities as described above. This supports a chain of evidence that may be necessary to introduce certain evidence in courtroom proceedings, such as data assets obtained through audio/visual recording means.

In at least one embodiment, activation of a portable device causes the portable device to take subsequent actions with respect to another device. For example, a dispatch center may activate a body worn camera of an officer responding to a reported crime incident. The body worn camera may be configured to send an activation or other type of signal to other devices associated with similar entities when it is activated. In one implementation, the body worn camera is associated with the name of an officer and, when it is activated, it activates other devices associated with the name of the officer, such as a car camera.

Furthermore, metadata is associated with stored audio and/or video clips, and includes metadata that identifies any groups of electronic devices activated in a particular activation event. This enables a user, when reviewing a particular event, to efficiently identify all devices associated with an activation event, and to quickly and easily access all possible evidentiary assets from those devices.

This Summary is provided to introduce a selection of concepts in a simplified form that is further described below in the Detailed Description. This Summary does not identify all key features or essential features of the claimed subject matter, and it is not intended to limit the scope of the claimed subject matter.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 2 is a diagram showing a concept of associating and storing device identifiers with various entity identifiers.

FIG. 3 depicts a flow diagram of an example process for assigning one or more entity identifiers with one or more devices.

DETAILED DESCRIPTION

Figure 1:
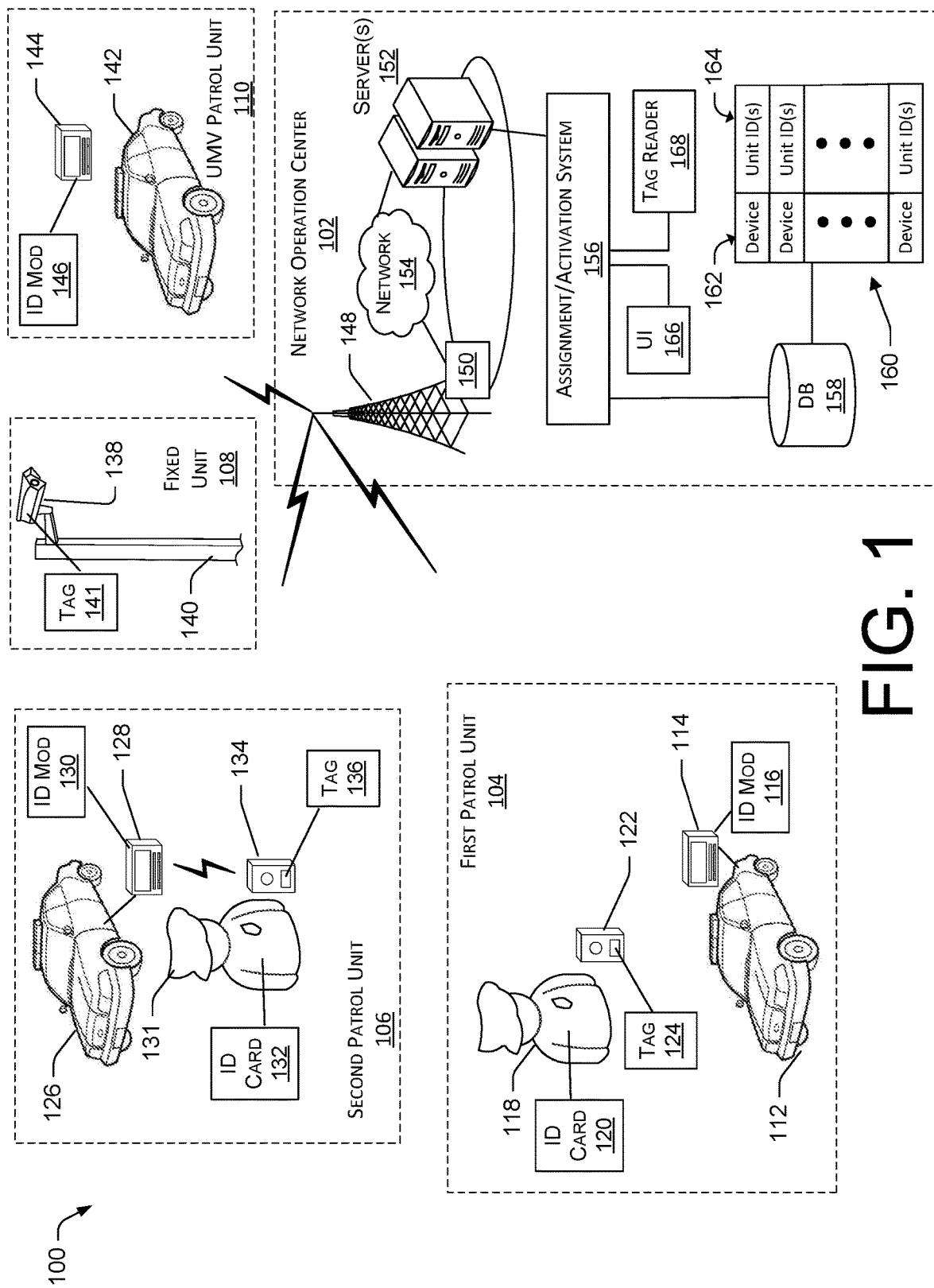
FIG. 1 illustrates an example architecture for systems and processes for controlling devices using entity identifiers.

This disclosure is directed to techniques for controlling portable electronic devices using entity identifiers. As used herein, the terms "device," "portable device," "electronic device," and "portable electronic device" are used to indicate similar items and may be used interchangeably without affecting the meaning of the context in which they are used. Furthermore, although the terms are used herein in relation to devices associated with law enforcement, it is noted that the subject matter described herein may be applied in other contexts as well, such as in a security system that utilizes multiple cameras and other devices.

The terms "device," "portable device," "electronic device," and "portable electronic device" and their plurals relate to any number of items typically used in the furthering of law enforcement activities. These items include, but are not limited to mobile audio and/or video recording devices (also referred to as body worn cameras, car cameras, etc.), personal computing devices, mobile phones, body sensors, and the like. They also include devices that may be fixed to a motor vehicle, such as a light bar, flashlight, spot light, siren, etc. Also, as used herein, the term "media," "audio/video," and "video" refers to still images, moving images, audio, and text.

Furthermore, any non-electric device may be included in a reference to an electronic device herein. For example, a gun holster may include an electronic sensor that detects when a gun is inserted into or withdrawn from the holster. Other electronic means may be associated with the holster to allow a signal to be sent to another device. In one scenario, a holster sensor detects when a gun is taken out of the holster, and a signal is sent to activate other devices (such as cameras) that are in the area. The activation may be caused directly (i.e., the signal is transmitted from the holster and received by the camera), or it may be caused indirectly (i.e., the signal is transmitted from the holster to a nearby electronic device, which relays an activation signal to other nearby devices.

It is noted that the term "portable" does not necessarily mean "mobile," and that a "portable" device may be affixed to a stationary item in certain instances. For example, a camera is a "portable" device even when it is fixed to a stationary item such as a lamp post or a building.

As will be discussed in greater detail, below, an "entity" is a person or thing that is identifiable by a name associated with the person or thing. For example, an "entity" can be a "person" that is identifiable by a name by which that person is known. An "entity" can also be a group of people wherein the group is identifiable by a group name and sub-group names. As used herein, "entity" also refers to a person or item having a named role, being located in a certain location identified by coordinates or a textual description. Other types of entities not used explicitly in the present description may be used with the techniques described herein without departing from the spirit or scope of the described techniques.

The term "activation" is used throughout the present description and generally means to start a function of a portable electronic device. For example, activating a body worn camera is used to indicate initiating a recording function of the camera. A device may be capable of performing more than one function, and any of the functions may be activated when the device is activated. Furthermore, the term "activation" can apply to turning a device on (i.e., applying power to the device) or otherwise placing the device in a mode wherein device functions may be initiated.

Activation of a portable electronic device can be executed by a mechanism that is physically located on the portable electronic device or on a computing device communicatively connected to the portable electronic device, either locally or remotely. Furthermore, activation of a portable electronic device can be initiated by a person or system in proximity to the device or by a person or system located remotely from the device.

Example implementations are provided below with reference to the following figures.

Example Architecture

FIG. 1 illustrates an example base architecture 100 on which systems and processes for controlling devices using entity identifiers may be implemented. The example architecture 100 includes a Network Operations Center 102, a first patrol unit 104, a second patrol unit 106, a fixed unit 108, and an unmanned vehicle (UMV) patrol unit 110. Other units, although not shown in FIG. 1, may also be included. For example, in operation it is assumed that a significantly greater number of patrol units, fixed units, and/or UMV patrol units may be implemented. Furthermore, other types of units not identified in FIG. 1 may also be used without departing from the presently identified concepts.

The first patrol unit 104 includes a law enforcement vehicle 112 having a computing unit 114 associated therewith. Typically, the computing unit 114 is a trunk-mounted unit that provides a user interface accessible to a vehicle operator, but the computing unit 114 may be wholly contained in a passenger compartment of the vehicle 112. The computing unit 114 can be a type of computer commonly referred to as a personal computer, or it may be a specialized computer designed to operate within specialized parameters of a law enforcement role. The computing unit 114 is part of a computer-assisted dispatch system, similar to those commonly in use by law enforcement agencies, and typically includes an audio/video recording function or a digital video recorder (DVR).

The computing unit 114 has an identification (ID) module 116 associated therewith. The ID module 116 is any device that stores a digital identifier associated with the computing unit 114, and may comprise a digital value stored in memory within the computing unit 114, or a device-readable tag or label fixed in some manner to the computing unit 114.

The first patrol unit 104 also includes a law enforcement officer (LEO) 118 that has an associated identification (ID) card 120 that identifies the law enforcement officer 118. The ID card 120 is typically an electronic badge that, on its face, identifies the LEO 118 with a name, photo, identification number, etc. The ID card 120 may also include a device-readable memory or tag that contains a digital value associated with the LEO 118.

The first patrol unit 104 also includes a portable electronic device that, in this example, is a body worn camera 122, that is capable of being worn on the person of the LEO 118 and recording audio and or visual data sensed by the body worn camera 122. The body worn camera 122 may include an input interface (not shown) that can comprise, for example, physical buttons, a gesture recognition mechanism, a voice activation mechanism, and/or the like. Through such an input interface, the body worn camera 122 (or other type of portable electronic device) can be manually activated by a user (e.g., a law enforcement officer) to start or stop recording data assets, communicate with connected devices, etc.

The body worn camera 122 includes a tag 124 that contains a digital value associated with the body worn camera 122. The digital value of the tag 124 may be stored in electronic memory included with the tag 124 or may be physically printed on the tag. Any manner in which the body worn camera 122 may be identified by visual inspection or by a reading device may be used and is consistent with the techniques described herein.

The second patrol unit 106 is similar to the first patrol unit 104 and includes a law enforcement vehicle 126 having a computing unit 128 associated therewith. The computing unit 128 includes an ID module 130 that allows the computing unit 128 to be uniquely identified.

The second patrol unit 106 also includes a law enforcement officer 131 that is associated with the law enforcement vehicle 126. The law enforcement officer 131 has an ID card 132 that includes specific information unique to the LEO 131, including a machine-readable digital value associated with the LEO 131. The second patrol unit 106 also includes a body worn camera 134 similar to the body worn camera 122 shown and described with respect to the first patrol unit 104. The body worn camera 134 of the second patrol unit 106 includes a readable tag 136 that contains a digital value associated with the body worn camera 134. The digital value of the tag 136 may be stored in electronic memory included with the tag 136 or may be physically printed on the tag. Any manner in which the body worn camera 134 may be identified by visual inspection or by a reading device may be used and is consistent with the techniques described herein.

It is noted that the body worn camera 134 may communicate directly with the computing unit 128 via any known wireless communication protocol, such as Bluetooth, BLE, WiFi (802.xx), cellular communication (e.g., 2 G, 3 G, 4 G, 5 G), etc. Although the computing unit 114 and the body worn camera 122 shown with respect to the first patrol unit 104 are not shown as being similarly communicatively coupled, it is noted that implementations may vary in this regard. If a computing unit is not directly communicatively coupled with an electronic device, it may also be connected via another technique, such as by way of a data transmission network, which will be described in greater detail with respect to further aspects of FIG. 1.

The fixed unit 108 includes a stationary camera 138 that is mounted to a fixed object such as, in this case, a stationary pole 140. The stationary camera 138 is configured to record digital visual data, but may also be configured to record digital or analog audio or visual data. Although shown mounted on a stationary pole 140, the stationary camera 138 may be mounted to any other fixed object, such as a building, or it may be mounted to a mobile object. For purposes of the present description, the stationary camera should be able to be identified by its location, either absolute or relative.

The stationary camera 138 includes a readable tag 141 that contains a digital value associated with the stationary camera 138. The digital value of the tag 141 may be stored in electronic memory included with the tag 141 or may be physically printed on the tag. Any manner in which the stationary camera 141 may be identified by visual inspection or by a reading device may be used and is consistent with the techniques described herein.

The UMV patrol unit 110 includes an unmanned law enforcement vehicle 142 that is similar in all respects to the law enforcement vehicles 112, 126 shown with respect to the first patrol unit 104 and the second patrol unit 106, except that the unmanned law enforcement vehicle 142 is designed to be operated without a driver. The unmanned law enforcement vehicle 142 may also be a smaller special-purpose vehicle used by bomb squads or SWAT teams in situations where it is advantageous to use a typically smaller vehicle that does not put a live officer in harm's way. The unmanned law enforcement vehicle 142 also includes a computing unit 144 having an ID module 146 included therewith. The ID module 146 includes a digital value that is readable by human or machine and is used to uniquely identify the computing unit 144.

The Network Operations Center (NOC) 102 is generally a communication, command, and control system of the architecture 100. In the present context, the NOC 102 may be part of a law enforcement agency or a facility that is operated by a third-party that is offering services to the law enforcement agency. The NOC 102 is used as a base from which to monitor operations, gather and disseminate intelligence information, and control devices under the control of law enforcement officers with which it is in communication.

The Network Operations Center 102 includes communications means that enable human or computer initiated communications with law enforcement officers and devices in remote locations. Particularly, in this example, the NOC 102 includes a transmission tower 148 and a base station 150 that enable communications. One or more servers 152 provide a network 154 through which the NOC 102 communicates with LEOs and devices. The network 154 may be a local area network (LAN), a wide-area network (WAN), a carrier or cellular network, or a collection of networks that includes the Internet. Network communication protocols (TCP/IP, 3 G, 4 g, etc.) may be used to implement portions of the network 154.

The servers 152 in the Network Operations Center 102 include an assignment/activation system 156 that contains the programmatic logic used in many of the techniques described herein. The assignment/activation system 156 is logically connected with a database 158, which stores information accessed and provided by the assignment/activation system 156. Among other things, the database 158 includes a data structure 160 storing multiple device identifiers 162 and multiple unit identifiers 164. Device identifiers 162 are associated with unit identifiers 164. Details of example data are shown and described below, with respect to one or more following figures.

The information stored in the database (provided by the assignment/activation system 156) includes metadata associated with media files collected through the system through, for example, video cameras and audio recorders. Such metadata includes that typically included with digital files in a file storage system, such as time and date stamps, file names, etc. In addition, the metadata may include one or more manually or automated identifiers or descriptors, and such identifiers or descriptors may be correlated with one or more other digital files. Such correlation is described in U.S. Pat. No. 8,311,983, issued on Nov. 13, 2012, titled "Correlated Media for Distributed Sources," and U.S. patent application Ser. No. 15/197,683, filed on Jun. 29, 2016, titled "Correlating Multiple Sources." The references patent and patent application are assigned to the assignee of the present application as of the filing date of the present application.

The assignment/activation system 156 includes a user interface 166. Although shown as a single unit, the user interface 166 includes hardware and software components necessary to render graphics in accordance with the present description. Furthermore, the user interface 166 includes hardware and/or software necessary to enter, assign, associate, and otherwise manipulate data as required by the presently described techniques.

The assignment/activation system 156 also includes a physical tag reader 168. The tag reader 168 is an RFID (radio frequency identification) reader or some similar device used to read digital values from objects in proximity to it. For example, the tag reader 168 can be used to read digital values stored in ID tags, ID cards, and ID modules included in the described architecture. The tag reader 168 may also be of a kind that can be configured to read non-electronic tags, such as bar codes and the like.

The assignment/activation system 156 is configured to assign certain portable electronic devices to certain law enforcement officers in various ways. For example, the assignment/activation system 156 can assign a portable electronic device to a specific law enforcement officer 118, 131 from a physical scan of the ID tag 124 associated with a portable electronic device. Alternatively, an assignment can be made via a computer user interface by associating a device identifier ID tag 124, 136 of a device with an identifier (e.g., ID card 120, 132) associated with a law enforcement officer 118, 131.

An auto-assign method may also be used to associate an electronic portable device with a law enforcement officer or group of law enforcement officers. For example, a portable electronic device 122, 134 may detect that it is proximal to a law enforcement officer 118, 131 and issue a query to the law enforcement officer 118, 131 as to whether the portable electronic device 122, 134 should be associated with the law enforcement officer 118, 131. If an affirmative response is received from the law enforcement officer 118, 131, then the portable electronic device 122, 134 is associated with the law enforcement officer 118, 131. Furthermore, entities associated with the law enforcement officer 118, 131 may also be associated with the portable electronic device 122, 134, either automatically according to a previous configuration instruction, or manually through the portable electronic device 122, 134, the assignment/activation system 156, the computing units 114, 128, 142, or any other practical method that is available.

An auto-assign method may also be used to associate an electronic portable device with a law enforcement officer or group of law enforcement officers. For example, a portable electronic device 122, 134 may detect that it is proximal to a law enforcement officer 118, 130 and issue a query to the law enforcement officer 118, 130 as to whether the portable electronic device 122, 134 should be associated with the law enforcement officer 118, 130. If an affirmative response is received from the law enforcement officer 118, 130, then the portable electronic device 122, 134 is associated with the law enforcement officer 118, 130. Furthermore, entities associated with the law enforcement officer 118, 130 may also be associated with the portable electronic device 118, 130, either automatically according to a previous configuration instruction, or manually through the portable electronic device 118, 130, the assignment/activation system 156, the computing units 114, 128, 142, or any other practical method that is available.

In this way, a law enforcement officer can check out a portable electronic device so that it is associated with that officer until it is checked in by the officer. Such an arrangement provides "chain-of-custody" protection for any evidence that may be associated with the checked out portable electronic device. For example, if the portable electronic device is a camera (such as the body worn cameras 122, 134), a check out/in system can be used to establish the whereabouts of the camera at all times and prove that a camera was in the custody of an officer or an agency over a continuous time period.

As will be discussed in greater detail, below, the network operations center 102 is configured to automatically activate one or more portable recording devices 122, 134, 138 following a transmission of a certain dispatch message to one or more of the computing units 114, 128, 144. With such a configuration, the assignment/activation system 156 determines that a certain type of dispatch message has been sent or received and activates one or more portable electronic devices based on their relationship to the object of the dispatch message. For example, if the network operations center 102 receives an "officer down" message from the body worn camera 122 associated with the first patrol unit 104, it may transmit an "officer down" message to a specific group of portable electronic devices to activate those devices. Such a specific group may be portable electronic devices belonging to a certain group, having a certain role associated therewith, located in a particular area, etc.

Example Data Table

FIG. 2 is a diagram of an example data table 200 showing a concept of associating and storing device identifiers with various entity identifiers. In the following discussion, reference is made to elements and reference numerals shown and described with respect to FIG. 1. Furthermore, it is noted that in the following discussion, references to entries in the example data table 200 are referred to by lettered rows (A-L), by numbered columns (1-7), or by a combination thereof (A1-L7). It is also noted that the example data table 200 may also represent a view available to a user via the user interface 166 shown and described with respect to FIG. 1.

Implementations of the techniques described herein include storing and associating relatable values, such as in a typical database system. The exact manner in which such storing and associating is irrelevant to the novel concepts provided herein. The manner in which the present example is provided is not intended to limit the scope of the claims presented herewith, but is intended merely to provide an example of what kinds of data may be used with the present techniques and how a data item may be associated with other data items and the significance thereof.

The example data table 200 includes a number of column headings (1-7) that relate to characteristics of a portable electronic device, a law enforcement officer, etc. The columns shown in the example data table 200 are "Device" 1A, "ID" 2A, "Group" 3A, "Subgroup" 4A, "Type" 5A, "Role" 6A, and "Location" 7A. It is noted that although these column headings referring to certain device or officer characteristics, others that are not shown here may also be included.

The data items in the example data table 200 are shown sorted according to a particular column heading. In this example, the table 200 is sorted according to the "Device" field (column 1). However, as in a typical database, the table 200 may be sorted according to any field shown in the table 200. For example, the table 200 could be sorted according to the "ID" field (column 2), which would sort the data according to officer or device names.

It is also noted that although only a single "Subgroup" (column 4) field is shown, a device or an officer may be associated with more than one subgroup. For example, Row B refers to an officer having a name (i.e., "ID") of "JStevens." According to the example table 200, "JStevens" is associated with a "Group" (column 3) identified as "Patrol" (meaning that Officer Stevens is a Patrol officer), and also a "Subgroup" (column 4) identified as "SE" (meaning that Officer Stevens is presently assigned to a southeast quadrant of an agency's jurisdiction. It is noted that there could be an additional subgroup, for example, "Precinct 3," that more particularly identifies a subgroup with which Officer Stevens is associated. In fact, any column heading could also include a sub-indication that further identifies particularities of the characteristic of the column heading.

Each value in the "Device" column identifies a portable electronic device. The value associated with a device is physically associated with a device by way of memory incorporated with the device (such as ID Modules 116, 130, 141, 146 shown in FIG. 1), or by a tag (124, 136) affixed with or associated with the device. The tag may be physically incorporated with the device (i.e., printed on a body of the device), or it may be on the tag by printing means or by memory means. Other methods may be used to incorporate a value identifying a device with the device.

Associated with each device identifier (column 1) are several fields containing characteristics of the device identified by the device identifier (column 1) or of a person or group associated with the device. For example, consider the first device identifier (CC0101) in the table 200. A device associated with that device identifier is an "ID" that identifies a person to whom the device is assigned, or identifies a name given to a particular instance of a device. The "ID" associated with device identifier "CC0101" is "JStevens," presumable a law enforcement officer. "JStevens" is part of a group ("Patrol") identified in the "Group" column (column 3), and a subgroup ("SE") identified in the "Subgroup" column (column 4). A device type is shown in the "Type" field (column 5), with device "CC0101" identified as being a "car cam."

A "Role" field (column 6) identifies a role of the officer shown in the "ID" field. Here, "JStevens" has a role of "Officer." Different roles may be related to each other, and some roles may be subservient to others. For example, an "Officer" role may be subservient to a "Lead" role, which allows the lead officer or devices associated with the lead officer to control portable electronic devices associated with officers having a role of "Officer." Such an arrangement provides an access system wherein a supervisory officer can access and control devices associated with officers supervised by the supervisory officer.

A "Location" field (column 7) contains a value that identifies a location of the device identified in the "Device" column. In the present example, Device "CC0101" is located at longitude 44.476457 and latitude 3.361816. In the case of mobile devices, the "Location" field may refresh and update as is practical. For fixed devices, such as the fixed unit 108 shown in FIG. 1, the "Location" value is static. The location may be shown as geographic coordinates or by another mapping system, such as a street address, a street intersection, a landmark, or any other way that may be used to identify a location. In the present example, "Fixed Cam" (5, D) having a device identifier of "SC772F" is shown at a location of a particular block ("1400 block") of a particular street ("4$^{th}$ Ave.").

Example Data Table—Alternate Sorting

FIG. 3 is a diagram of another example data table 300 showing the example data table 200 of FIG. 2 sorted in an alternate manner. In the following discussion, reference is made to elements and reference numerals shown and described with respect to FIG. 1. Furthermore, it is noted that in the following discussion, references to entries in the example data table 200 are referred to by lettered rows (A-L), by numbered columns (1-7), or by a combination thereof (A1-L7). It is also noted that the example data table 200 may also represent a view available to a user via the user interface 166 shown and described with respect to FIG. 1.

The example data table 300 shown includes the same data items as does the example data table 200 (FIG. 2), but the data items have been re-arranged to key off of the "ID" column (column 1) rather than the "Device" column (column 2). In this particular example, the "ID" fields (column 1) are sorted according to alphabetical order, though they may be arranged in a different way. Viewing the data items in this way makes it easier to see devices assigned to a particular officer, if that is a view desirable by a user. Other arrangements of the data may also be provided.

Example Portable Electronic Device

Figure 4:
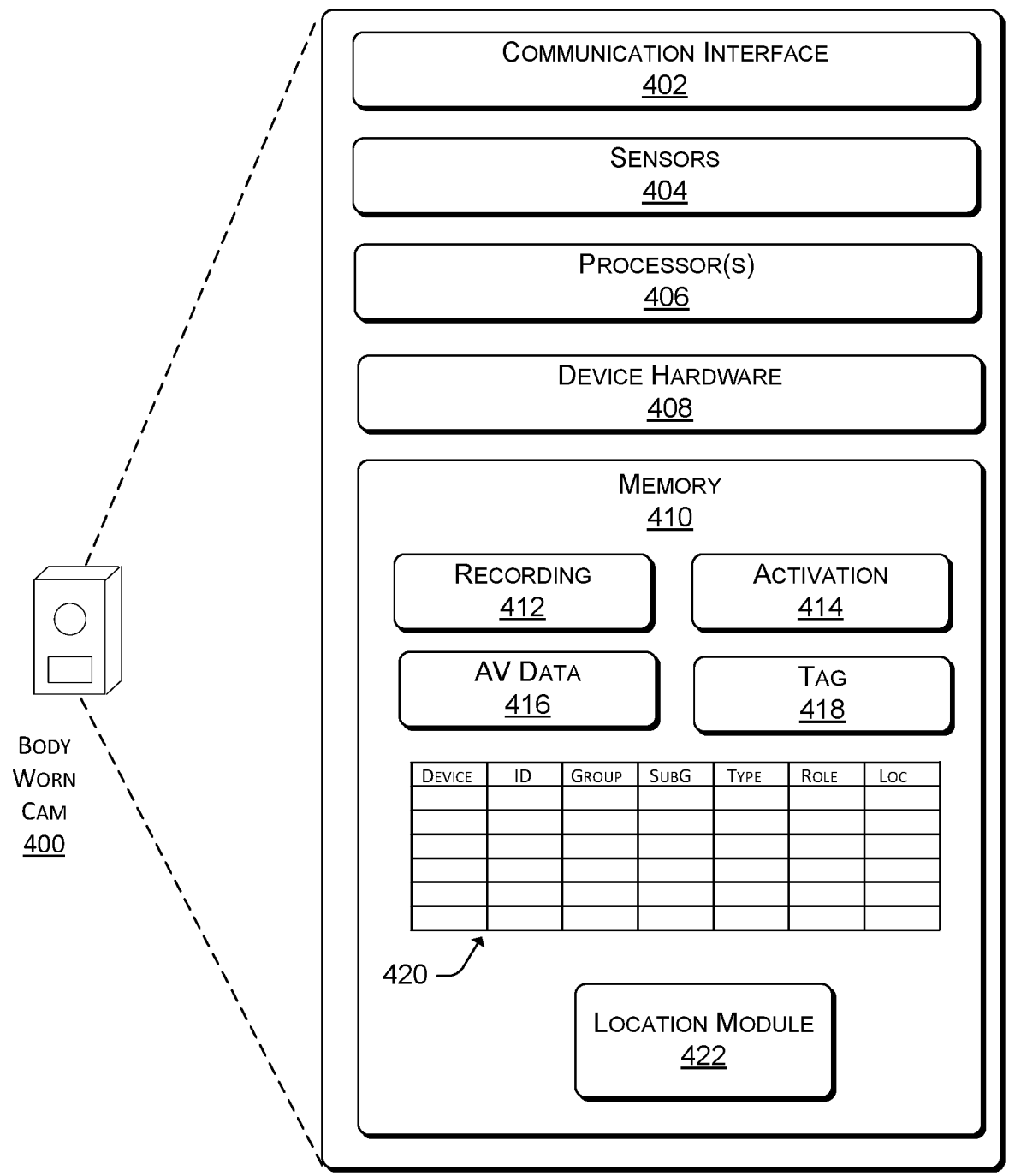
FIG. 4 is a block diagram of an example portable electronic device in accordance with the present description.

FIG. 4 is a block diagram showing various components of an example of a type of portable electronic device, particularly, an example body worn camera 400 (similar to the body worn cameras shown and described with respect to FIG. 1 (122, 134)) of a type typically used in law enforcement. As described with respect to FIG. 1, the example body worn camera 400 is communicatively coupled to one or more other devices, such as a computing unit 114, 128 and servers 152. Although shown with particular features and components, it is understood that any body worn camera or other portable electronic device constructed in accordance with the present description may contain fewer, greater, or different components and features than shown in FIG. 4, without departing from the scope of the claims.

The example body worn camera 400 is equipped with a communication interface 402, one or more sensors 404, one or more processors 406, device hardware 408, and memory 410. The communication interface 402 may include wireless and/or wired communication components that enable the device to transmit or receive voice or data communication via the network 154, as well as other telecommunication and/or data communication networks. The sensors 404 include a compass, an accelerometer, and/or a global positioning system (GPS) sensor. The sensors 404 are configured to detect orientation, movement, and geolocation of the body worn camera 400. A location module 422 is stored in the memory and includes executable instructions that work with the sensors 404 to determine a location of the body worn camera 400 and to store location information in one or more memory locations for further processing.

The device hardware 408 may include a camera, a microphone, and user interface hardware, such as physical buttons, a gesture recognition mechanism, or a voice activation mechanism. The device hardware 408 may further include signal converters, antennas, modems, hardware decoders and encoders, graphic processors, a subscriber identity module (SIM) card slot, and/or the like that enable the body worn camera 400 to execute applications and provide telecommunication and data communication functions.

The memory 410 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 406 and the memory 410 of the body worn camera 400 may implement a recording module 412, an activation module 414, an audio/visual data module 416, and a tag 418 (similar to the tags 124, 136 shown in FIG. 1). These modules may include routines, program instructions, objects, and/or data structures that perform particular tasks or implement particular abstract data types. The memory 410 also provides a data store 420 that stores, inter alia, values that identify devices, people, groups of people or devices, sub-groups of people or devices, roles of people or devices, and locations of people or devices.

The recording module 412 records data assets via a camera and/or a microphone (not shown). The data assets may be in the form of video recordings, audio recordings, and/or multimedia recordings. Accordingly, the recording module 412 may include codecs, signal filters, coding functions, and/or error correction functions that enable the recording module 412 to convert generate digital files from camera and microphone signal inputs.

The activation module 414 may activate the recording module 412 to capture data assets based on an activation signal from a computing unit 114, 128, 144 or the network operations center 102. The activation module 414 may also receive manual inputs that start, stop, or pause the recording of data assets via a user interface (not shown) of the body worn camera 400. A computing unit 114, 128, 144 may generate an activation signal upon receiving a user input at the device. The network operations center 102 may generate an activation signal for the recording module 412 in response to determining that a dispatch request has been sent to one or more of the computing units 114, 128, 144.

Example Computing Device

Figure 5:
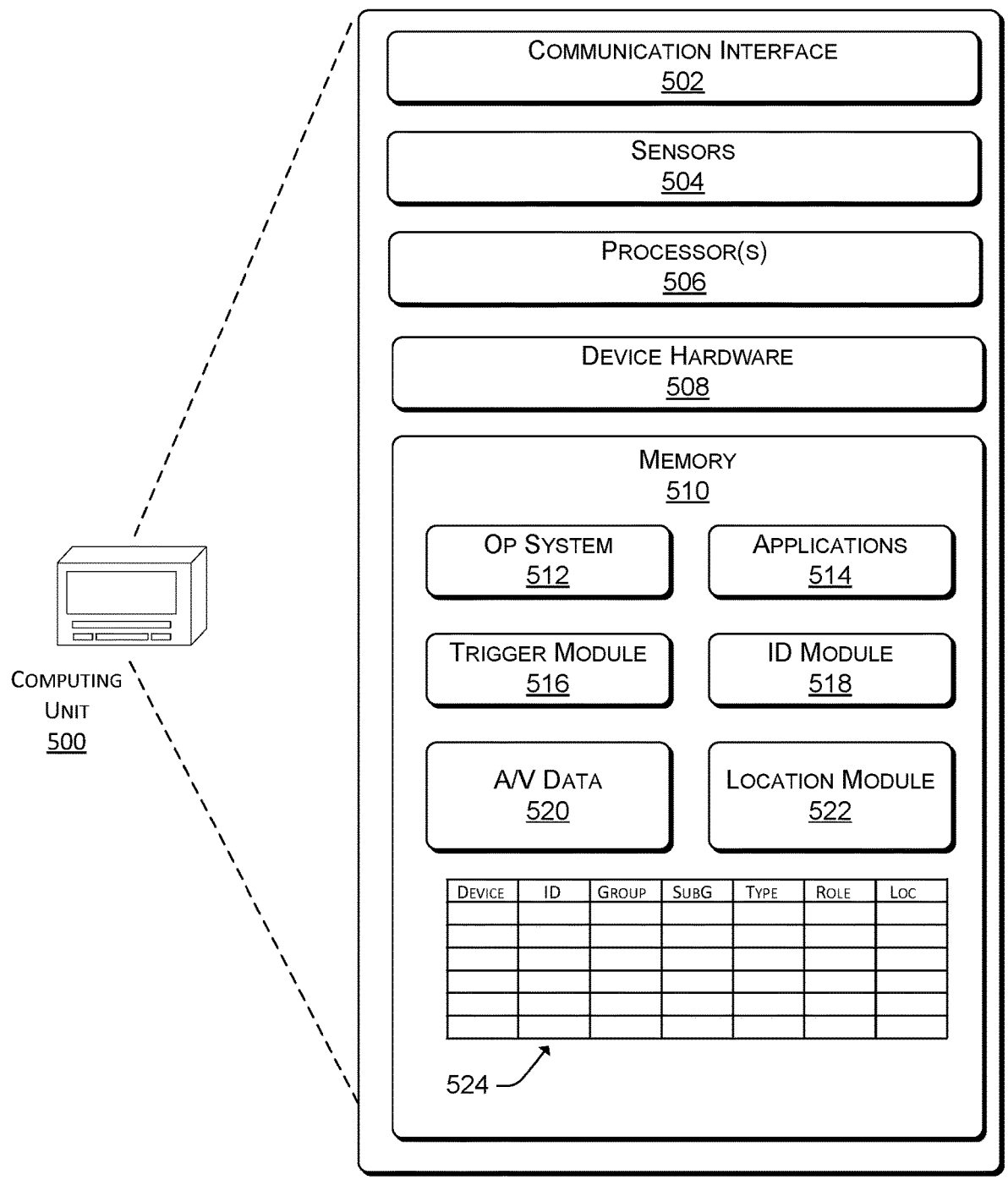
FIG. 5 is a block diagram of an example computing device in accordance with the present description.

FIG. 5 is a block diagram showing various components of an example computing unit 500 that is capable of activating one or more portable electronic devices for law enforcement use. The example computing unit 500 is similar to the computing units 114, 128, 144 shown and described with respect to FIG. 1.

The example computing unit 500 is equipped with a communication interface 502, one or more sensors 504, one or more processors 506, device hardware 508, and memory 510. The communication interface 502 may include wireless and/or wired communication components that enable the device to transmit or receive voice or data communication via the network 154, as well as other telecommunication and/or data communication networks. The sensors 504 may include a compass, an accelerometer, and/or a global positioning system (GPS) sensor. The compass, the accelerometer, and the GPS sensor may detect orientation, movement, and geolocation of the example computing unit 500.

The device hardware 508 includes various hardware that is typically located on a computing unit. For example, the device hardware 508 may include signal converters, antennas, modems, hardware decoders and encoders, graphic processors, a subscriber identity module (SIM) card slot, and/or the like that enable the example computing unit 500 to execute applications and provide telecommunication and data communication functions.

The memory 510 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 506 and the memory 510 of the example computing unit 500 implement an operating system 512 and one or more software applications 514. The operating system 512 includes components that enable the example computing unit 500 to receive and transmit data via various interfaces, e.g., user controls (not shown), communication interface 502, and/or memory input/output devices (not shown). The operating system 512 also processes data using the one or more processors 506 to generate outputs based on inputs that are received via hardware and/or software user interfaces. For example, the operating system 512 may provide an execution run-time environment for executing the applications 514. The operating system 512 may also include a presentation component that presents the output (e.g., display the data on an electronic display, store the data in memory, transmit the data to another electronic device, etc.). The operating system 512 may include other components that perform various other functions generally associated with an operating system. For example, the operating system 512 may enable a user to interact with the applications 514 and other modules stored in the memory 510. The applications 514 may include utility and productivity applications. For example, the applications 514 may include telephony applications, electronic communication applications, and mobile data terminal applications to display dispatches and related information received from the network operations center 102 (FIG. 1).

The one or more processors 506 and the memory 510 of the example computing unit 500 also implements a trigger module 516 that can include routines, program instructions, objects, and/or data structures that perform particular tasks or implement particular abstract data types. The trigger module 516 is configured to send activation signals to a portable electronic device 122, 134, 138. The activation signals may be sent via the trigger module 516 in response to manual inputs to the module. In other instances, the activation signals may have originated from the network operations center 102, and the trigger module 516 may simply relay such signals to the portable electronic devices 122, 134, 138.

In one or more embodiments, the trigger module 516 is configurable and may be configured to send activation signals to a set of portable electronic devices 122, 134, 138 that are associated with particular devices, people, groups, subgroups, roles, and/or locations. For example, the trigger module 516 may be configured to send an activation signal to all portable electronic devices that are associated with an entity identifier with which the example computing unit 500 is associated. Suppose that the example computing unit 500 has been associated with a particular group of officers according to methods previously described. The trigger module 516 can be configured to, upon actuation, send an activation signal (or other type of signal), to all portable electronic devices (such as a body worn cameras) that are associated with the particular group. Such a signal may be used to activate portable electronic devices belonging to officers that are nearby the example computing unit 500.

The memory 510 also include audio/visual data 520, which includes stored data representing audio clips or video images, and a location module 522 that is configured to work in conjunction with one or more of the sensors 504 to provide updated location information to the example computing unit 500. The memory 510 also provides a data store 524 that stores, inter alia, values that identify devices, people, groups of people or devices, sub-groups of people or devices, roles of people or devices, and locations of people or devices.

Example Server Components

Figure 6:
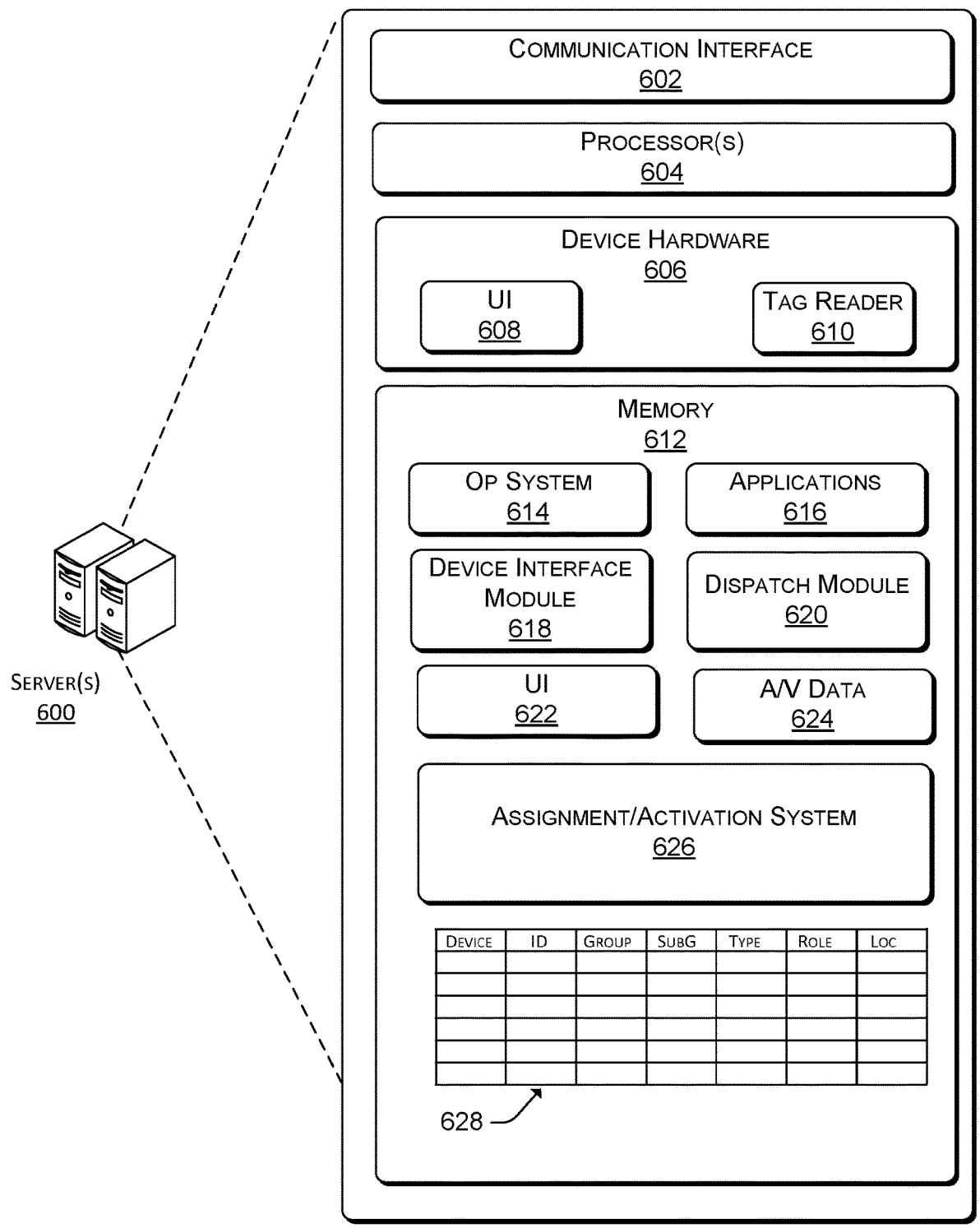
FIG. 6 is a block diagram of block diagram of an example server in accordance with the present description.

FIG. 6 is a block diagram showing various components of an example server 600 such as the server(s) 152 shown and described in association with the network operations center 102 of FIG. 1. The example server 600 includes a communication interface 602, one or more processors 604, and device hardware 606.

The communication interface 602 facilitates communication with components located outside the example server 600, and provides networking capabilities for the example server 600. For example, the example server 600, by way of the communication interface, may exchange data with other electronic devices (e.g., laptops, computers, other servers, etc.) via one or more networks, such as the Internet, the network 154 of which the network operation center 102 (FIG. 1) is a part. Communications between the example servers 600 and the other electronic devices may utilize any sort of communication protocol for sending and receiving messages, such as TCP/IP and/or HTTP. In some embodiments, the example server 600 may be substituted with a plurality of networked servers, such as servers in a cloud computing network.

The device hardware 606 includes various components that are necessary to support basic operational functionality of the example server 600. Such components include, but are not limited to, a user interface (UI) 608 and a tag reader 610. The UI comprises one or more hardware components that support user interaction with the example server 600, such as a keyboard, a mouse, a display, a microphone, a camera, and/or the like. The tag reader 610 is a device that is configured to read a digital value from a physical article, such as an identification badge, a bar code, a near-field communication or RFID circuit, memory, etc.

The example server 600 also includes memory 612 that stores data, executable instructions, modules, components, data structures, etc. The memory 612 may be implemented using computer readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism.

The one or more processors 604 and the memory 612 of the example server 600 implement an operating system 612. The operating system 612 can include components that enable the example server 600 to receive and transmit data via various inputs (e.g., user controls, network interfaces, and/or memory devices), as well as process data using the one or more processors 604 to generate output. The operating system 614 may include a presentation component that presents the output (e.g., display the data on an electronic display, store the data in memory, transmit the data to another electronic device, etc.). Additionally, the operating system 612 may include other components that perform various additional functions generally associated with an operating system. The one or more processors 604 and the memory 612 of the example server 600 also implements a device interface module 616, a dispatch module 618, a user interface software module 620, and one or more software applications 622. These modules may include routines, program instructions, objects, and/or data structures that perform particular tasks or implement particular abstract data types. The memory 612 also includes audio and/or video data 624, which includes digital representations of audio and/or video clips gathered in the course of law enforcement activities. In addition, the A/V data 624 also includes file information, metadata, tagged data assets, and the like.

One software application 622 that may be available on the example server 600, is an application that performs a search and/or browse function. One of the advantages to implementing some of the presently described techniques is that they enable a user to quickly and easily identify all devices that were activated in response to an activation event. As previously described, when an activation is initiated—whether manually or automatically by a device—certain metadata is captured and stored that is related to data assets captured in response to the activation. This metadata includes other devices and groups of devices that were activated in response to the activation event, such as devices belonging to nearby officers, nearby stationary cameras, etc. For example, if a camera is associated with group name "Patrol" and subgroup name "NE," then when an activation of the camera is made, media captured by the camera is tagged with metadata that includes "Patrol" and "NE."

In such an application, a search may be performed for metadata related to an activation event. When a user finds certain metadata, the user is then able to quickly locate all evidentiary assets (such as audio and/or video clips) that are related to a certain activity, such as an "officer down" scenario, a "gun drawn" scenario, etc. Using the example related in the previous paragraph, when a user is accessing stored media captured by the camera, the user can easily see that the camera is associated with the "Patrol" group and "NE" subgroup. The user can then examine media assets from devices in those groups to quickly find media related to an activation event that caused the camera to start recording.

This feature can save a significant number of hours of research to find out devices that were in an area of an event at a certain time and sifting through media from a number of devices to determine which devices contain relevant material.

The device interface module 616 facilitates communication with the computing units 114, 128, 144 and portable electronic devices 122, 134, 138. In various embodiments, the device interface module 616 receives body metrics information, tagged data assets, as well as other data from the computing units 114, 128, 144 and/or the portable electronic devices 122, 134, 138. In at least some embodiments, the tagged data assets may be data tagged with metadata and audio and/or video data. In turn, the device interface module 616 may transmit signals generated by other modules, including dispatch information, activation signals, as well as other data to the computing units 114, 128, 144 and/or the portable electronic devices 122, 134, 138.

The dispatch module 618 is configured to send dispatch requests to the computing units 114, 128, 144, the portable electronic devices 122, 134, 138, and other devices (not shown). In various embodiments, the dispatch module 618 may be part of a computer-assisted dispatch system. The dispatch request may include an incident location, time and date of the incident, an incident description, identification of parties involved in the incident, type of assistance requested for the incident, and/or so forth. In turn, the dispatch module 618 may receive information from remote devices (e.g., computing units 114, 128, 144, portable electronic devices 122, 134, 138, etc.). The information may include resolution reports, updates to incident and party descriptions, time and dates of incident resolution, and/or so forth.

The memory 612 also includes an assignment/activation system (AAS) 626 similar to the assignment/activation system 156 shown and described in with respect to FIG. 1. The AAS 626 is configured to perform a number of significant processes, including identifying electronic devices, assigning electronic devices to a person or other entity, assigning electronic devices to a group or sub-group of persons or entities, initiating activation signals to activate portable electronic devices, etc.

The AAS 626, in operation, reads, stores, and manipulates data in a data store 628 that is stored in the memory 612. Similar to data stores shown and described with respect to other figures, the data store 628 in the example server 600 stores values associated with portable electronic device identifiers ("Device"), with persons and/or entities ("ID"), with groups of persons or entities ("Group"), with subgroups of persons or entities ("SubG"), with device types ("Types"), with roles ("Roles"), with locations ("Location"), or other types of entities.

The functions of the example server 600 and its components will be described in greater detail below, with respect to process flow diagrams associated with functionality of the example server 600 and other devices and/or systems.

Example Device—Holster

Figure 7:
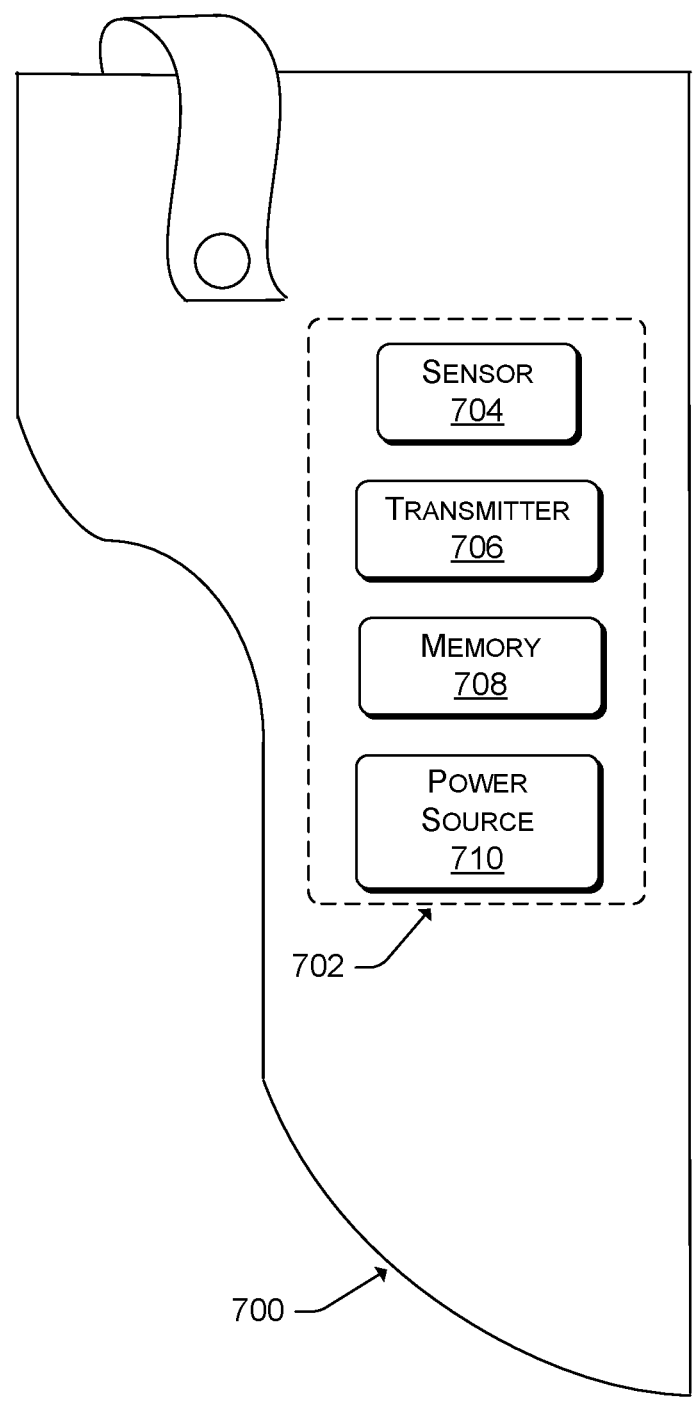
FIG. 7 is a diagram of an example holster 700 that may be used in accordance with the techniques described herein.

FIG. 7 is a diagram of an example holster 700 that may be used in accordance with the techniques described herein. Although the example shown and described in relation to FIG. 7 relates to a holster, the example can relate to any electronic device. Specifically, the example can relate to any non-electric device that has been equipped to detect an event and send a signal in response to the detected event.

The example holster 700 includes a sensor assembly 702 that is comprised of a sensor 704, a transmitter 706, memory 708, and a power source 710, such as a battery. The sensor 704 is configured to detect when a gun (not shown) is placed into or withdrawn from the holster. To accomplish this, the sensor may be of a type to detect metal, or a corresponding device may be included in or on the gun that communicates with the sensor when it is in close proximity to the sensor. Such sensors are known in the art and any such sensor may be used to implement the described techniques.

The transmitter 706 is configured to transmit a signal when the sensor 704 detects that a gun has been withdrawn from the holster 700. The signal sent by the transmitter 706 is one that is recognized by one or more computing devices in the described architecture 100 (FIG. 1). The signal is transmitted directly to at least one device. In some instances, a device receiving the signal is configured to send a signal to one or more other devices to initiate an action.

The memory 708 stores logic and data associated with the sensor assembly 702. The memory 708 may be configured to store device identifiers and/or entity identifiers to designate one or more groups of devices to which a signal when the sensor 704 detects that a gun (not shown) is taken from the holster 700. It is noted that in one or more alternative implementations, a different device may store device and group identifiers that are activated when a signal is transmitted from the sensor assembly 702. For example, the transmitter may send a signal to a computing unit 114 in a nearby car 112 associated with an officer 118, and the computing unit 114 may be configured to transmit a related signal to a device or group of devices associated with the holster activation event.

The power source 710 is one that is sufficient to operate the other elements in the sensor assembly 702. Any small battery, non-contact power source, or other such power source may be used without departing from the scope of the present claims.

Example Processes

Figure 8:
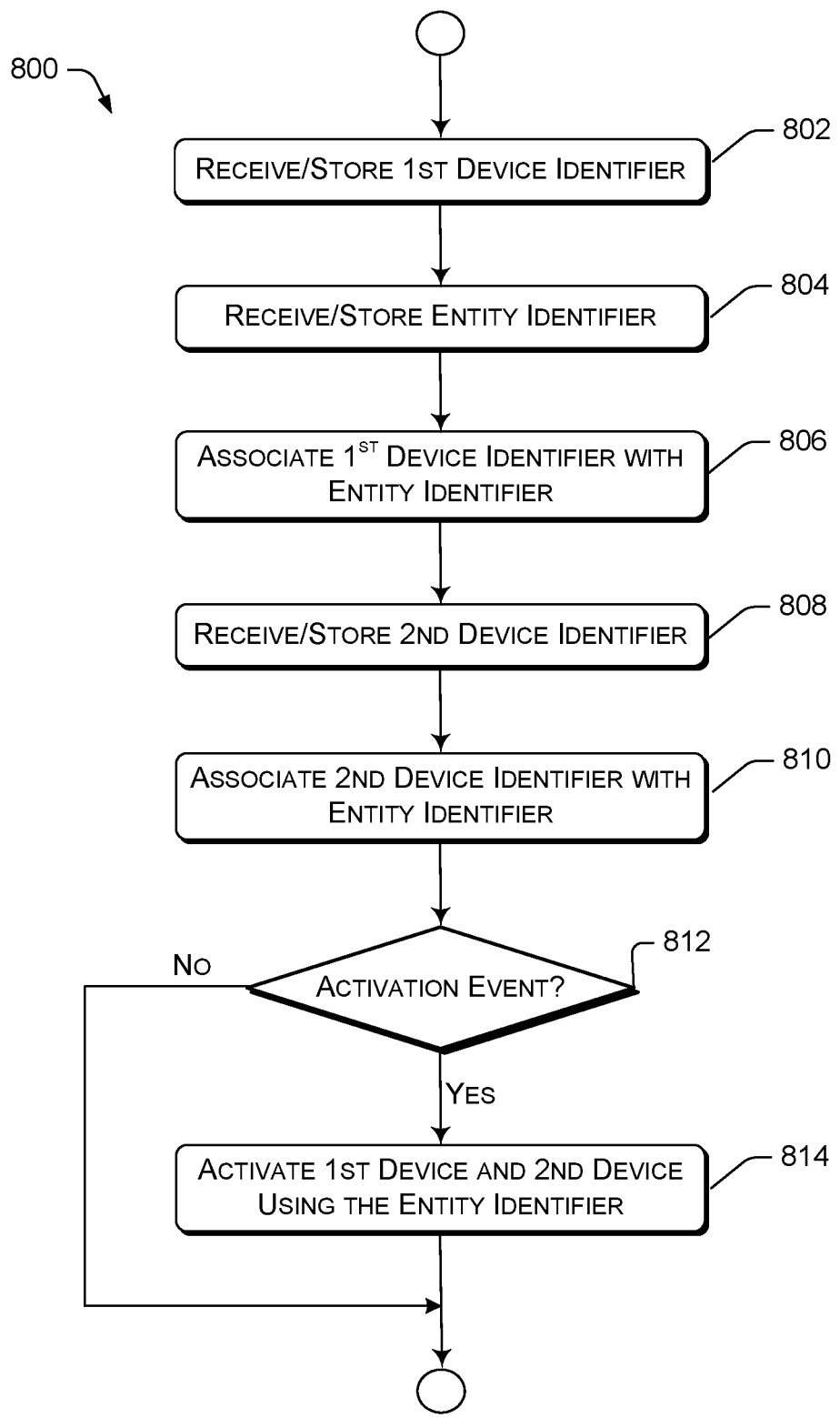
FIG. 8 is a flow diagram of an example process for assigning multiple portable electronic devices to a single entity name, and activating the multiple portable electronic devices using the single entity name.
Figure 9:
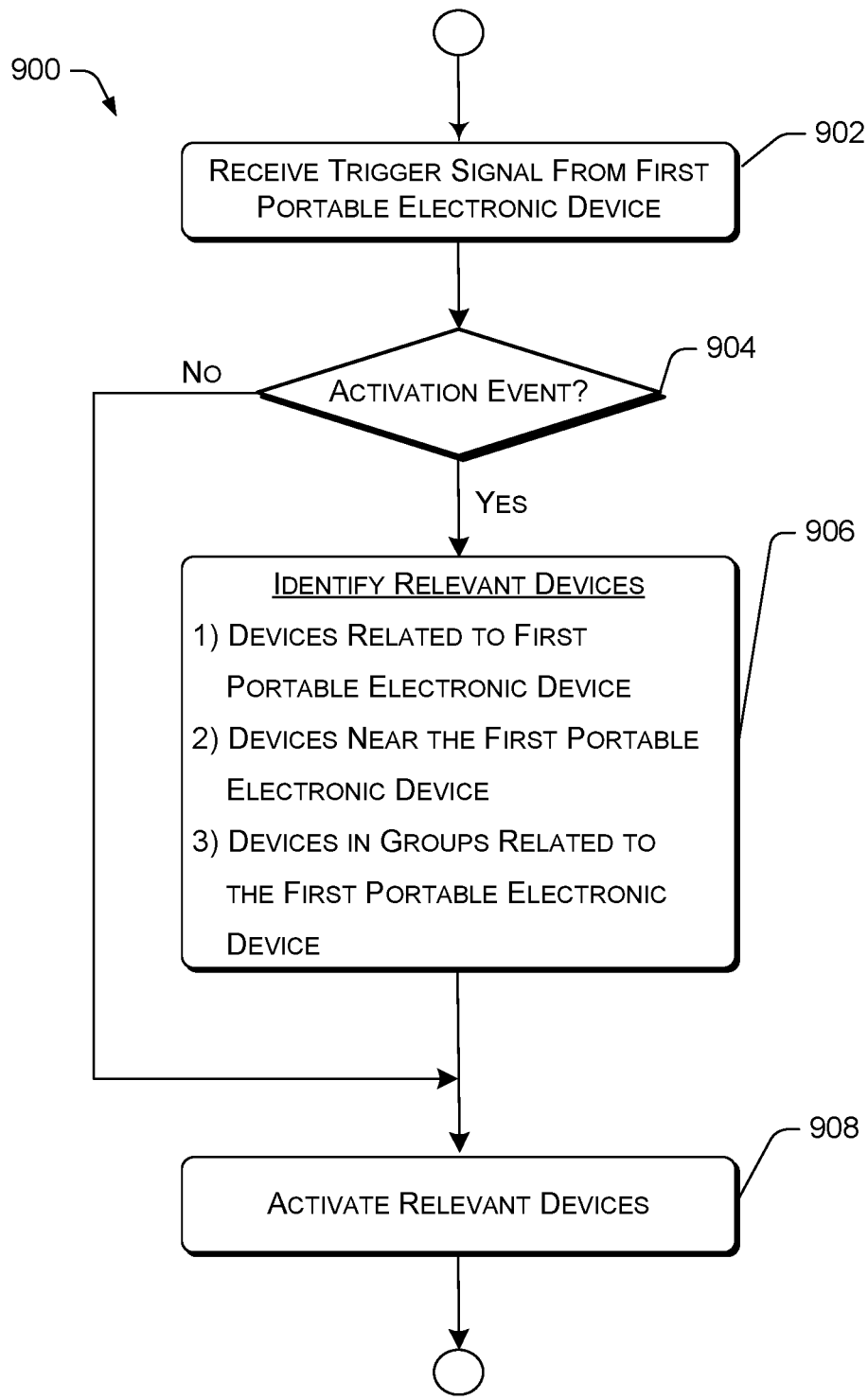
FIG. 9 is a flow diagram of an example process for activating a second device from a first device that has been activated.

FIGS. 8 and 9 present illustrative processes 800 and 900 for implementation of the techniques described herein. Each of the processes 800 and 900 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 800 and 900 are described with reference to the architecture 100 of FIG. 1.

FIG. 8 is a flow diagram 800 depicting a process for associating a device with an entity that may have a plurality of members, and for activating multiple devices that are associated with a unique entity identifier. The process depicted by flow diagram 800 may be performed by the assignment/activation system 156 of the network operation center 102, or certain alternative implementations may perform one or more operations of the process in another system unit.

At block 802, the assignment/activation system (AAS) 156 receives a first device identifier that is associated with a first portable electronic device. As previously described, a device may have an identifier associated therewith by one of several means, such as by way of a tag 124, 126, an ID module 116, 130, 141, 146, or any other way known in the art. A device identifier may also be manually entered into the AAS 156 by a system operator.

The received first device identifier is also stored in the database 158 associated with the AAS 156 (also shown as the data stores of FIG. 4 (420), FIG. 5 (524), and FIG. 6 (628)) (block 802). At block 804, the AAS 156 receives and stores an entity identifier. The entity identifier may identify a person or other entity, a group of persons or entities, one or more subgroups of persons or entities, a device type, a role, a location, or other characteristic of the first device or users of portable electronic devices. For example, in a context of law enforcement, the entity identifiers examples are:

ID: Officer name or badge number

Group: Patrol, Narcotics, Domestic Violence, etc.

Subgroup: Southeast, Northeast, West, etc.

Type: Car camera, body worn camera, body sensor, fixed camera, light bar, etc.

Role: Officer, Lead Officer

Location: Absolute (geographic coordinates), street/intersection location, etc.

Although specific examples in a specific context are mentioned (see also, FIG. 3 and FIG. 4), it is noted that any number of other examples in this or numerous other contexts may be used without departing from the scope of the present claims.

The entity identifier may be manually entered into the AAS 156, or it may be performed automatically in one or more of several ways. For instance, the AAS 156 can be configured to associate a particular entity identifier (e.g., an officer name) with other identifiers (e.g., an officers group, subgroup, role, etc.). Any method may be used to assign one or more entity identifiers to a device without departing from the scope of the present claims.

At block 806, the AAS 156 assigns the first device identifier with the entity identifier stored in block 804. This assignment creates a relationship in the database 158 of the AAS 156.

A second device identifier associated with a second portable electronic device is received and stored at block 808. This operation is similar to the operations described above with respect to the first device identifier. At block 810, the AAS 156 associates the second device identifier with the entity identifier that is associated with the first device identifier. In this way, the entity identifier is associated with the first portable electronic device and the second portable electronic device.

When an activation event is detected ("Yes" branch, block 712), the AAS 156 activates the first portable electronic device and the second portable electronic device at block 814 using the entity identifier. Typically, the term "activation" means switching a portable electronic device from a non-active (i.e., "sleep") mode to an active mode. For example, if the portable electronic device is a camera, activating the camera can be an action of placing the camera in a recording mode. In other contexts, "activation" may bean something else, such as turning a device from a non-power (i.e., "off") state to a powered (i.e., "on") state. As long as no activation event is detected ("No" branch, block 812), no activation operation occurs.

As stated, the activation is accomplished using the entity identifier. That means that an action taken with respect to the entity identifier, which is associated with the first device identifier (and thus the first portable electronic device) and the second device identifier (and thus the second portable electronic device) initiates an activation action on both the first portable electronic device and the second portable electronic device.

The action taken with respect to the entity identifier may be manual or automatic. For example, such an action may be taken by actuating an icon on a user interface that identifies the entity identifier. More specifically, a system operator may touch a UI icon that states "Subgroup SE" to activate devices associated with an entity identifier "SE" in a subgroup field of a data store. An example of an automatic action taken with respect to the entity identifier is the case when the AAS 156 is programmed to activate devices associated with a same group name is as a device that is activated. More specifically, an activation event may occur at a device at a certain location. The AAS 156 may be programmed to automatically activate all or certain devices that are located within a specific area that includes the certain location, such as a pre-defined zone or neighborhood.

The activation that takes place at block 814 may also be accomplished directly or indirectly. A direct activation occurs when the activating entity transmits an activation signal directly to a device to be activated. An indirect activation occurs when the activating entity transmits an activation signal to a first device, which is configured to activate one or more other devices based on the activation signal. For example, the network operation center 102 may send an activation to the computing unit 114 of the first patrol unit 104. Thereafter, the computing unit 114 may send an activation signal to the body worn camera 122 based on a type of activation message, content included in the activation message, a pre-configuration, etc.

FIG. 9 is a flow diagram 900 depicting a process for associating a device with an entity that may have a plurality of members, and for activating multiple devices that are associated with a unique entity identifier. The process depicted by flow diagram 900 may be performed by the assignment/activation system 156 of the network operation center 102, or certain alternative implementations may perform one or more operations of the process in another system unit.

At block 902, a receiving device (such as computing unit 114, 128, 144) receives a trigger signal from a first portable electronic device, such as body worn camera 122, 134. If the trigger signal is an activation signal ("Yes" branch, block 904), then the receiving device identifies relevant devices at block 906. As long as no activation signal is detected ("No" branch, block 904), then the action of block 906 is not performed.

The term "relevant device" can mean several things. For purposes of the present description, "relevant devices" are:

a. Devices related to the first portable electronic device;

b. Devices located near the first portable electronic device; and/or c. Devices in groups related to the first portable electronic device.

The determination of relevant devices is made using information stored in the data structure 160 (FIG. 1), the data table 200 (FIG. 2), the data table 300 (FIG. 3), the data store 420 (FIG. 4), the data store 524 (FIG. 5), and/or the data store 628 (FIG. 6). In one or more implementations presently described, a first device is deemed to be related to a second device if a first device identifier associated with the first device and a second device identifier associated with the second device share at least one common field in the data structure/table/store 160, 200, 300, 420, 524, 628. A device is deemed to be located near the first portable electronic device if it is within a certain distance (configurable) from the first portable electronic device, if it in a same pre-defined area (e.g., zone or neighborhood) as the first portable electronic device, or if it is some other way identified as being location near the first portable electronic device.

Furthermore, a device in a group is deemed to be related to a first device if the same entity name is associated with the device in the group and the first device. Particular limitations may be put on which devices are activated under specific circumstances, so all associated devices may not be activated in response to the first device being activated. This detail varies between different implementations of the presently described and claimed techniques.

At block 908, the relevant devices are activated by the receiving device an any manner describe above or otherwise known in the art.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
storing a relationship between an entity identifier of an entity and a first device identifier of a first electronic device;
storing a relationship between the entity identifier and a second device identifier of a second electronic device;
detecting an activation event associated with the entity identified by the entity identifier; and
in response to detecting the activation event, initiating an activation action on both the first electronic device and the second electronic device by reference to the stored relationship between the entity identifier and the first device identifier and the stored relationship between the entity identifier and the second device identifier using the entity identifier as a key.

2. The method as recited in claim 1, wherein the entity identifier further comprises a person's name.

3. The method as recited in claim 1, wherein the entity identifier further comprises a group name that is associated with more than one person.

4. The method as recited in claim 1, wherein the entity identifier further comprises a role name.

5. The method as recited in claim 1, wherein the entity identifier further comprises a location name.

6. The method as recited in claim 1, wherein the entity identifier further comprises location coordinates.

7. The method as recited in claim 1, wherein the entity identifier further comprises a device type.

8. The method as recited in claim 1, wherein the activation event further comprises a user selection of the entity.

9. The method as recited in claim 1, wherein the detecting an activation event further comprises detecting that a message pertinent to the entity identifier is transmitted.

10. The method as recited in claim 1, further comprising:
storing metadata related to the entity identifier, the first electronic device, the second electronic device, and data assets captured in response to the activation by the first electronic device and the second electronic device that were activated in response to the activation event; and
enabling access to the captured data assets by reference to the stored metadata using at least one of the first electronic device or the second electronic device as a key.

11. The method as recited in claim 1, wherein the activating of the first electronic device and the second electronic device includes:
switching the first electronic device from a non-active mode to an active mode using the relationship between the entity identifier and the first electronic device identifier, and
switching the second electronic device from a non-active mode to an active mode using the relationship between the entity identifier and the second electronic device identifier.

12. The method as recited in claim 1, wherein the activating of the first electronic device and the second electronic device includes:
turning the first electronic device from a non-power state to a powered state using the relationship between the entity identifier and the first electronic device identifier, and
turning the second electronic device from a non-power state to a powered state using the relationship between the entity identifier and the second electronic device identifier.

13. The method as recited in claim 1, wherein the activating of the first electronic device and the second electronic device includes:
transmitting a first message configured to:
directly activate the first electronic device using the relationship between the entity identifier and the first electronic device identifier, and
indirectly activate the second electronic device using the relationship between the entity identifier and the second electronic device identifier, via a second message transmitted from the first electronic device to the second electronic device in response to the first message.

14. The method as recited in claim 13, wherein the first message is configured to indirectly activate the second electronic device based on the type of the first message.

15. The method as recited in claim 13, wherein the first message is configured to indirectly activate the second electronic device based on content of the first message.

16. The method as recited in claim 13, wherein the first message is configured to indirectly activate the second electronic device based on a pre-configuration of the first electronic device.

17. A method, comprising:
receiving a trigger signal from a first portable electronic device associated with a first identifier;
identifying an association of a plurality of other portable electronic devices associated with respective second identifiers with the first portable electronic device using structured metadata in which the association between the plurality of other portable electronic devices and the first portable electronic device is indicated by a shared field in the structured metadata;
determining that the trigger signal indicates an activation of the first portable electronic device; and
in response to the determining that the trigger signal indicates an activation of the first portable electronic device, activating, by reference to the shared field, the plurality of other portable electronic devices using the first identifier as a key.

18. The method as recited in claim 17, wherein the identifying of other portable electronic devices comprises identifying portable electronic devices that are associated with the first portable electronic device, based on having a similar identifier as the first portable electronic device.

19. The method as recited in claim 17, wherein the identifying of other portable electronic devices comprises identifying portable electronic devices that are within a particular distance of the first portable electronic device.

20. A system, comprising:
one or more processors;
memory operably coupled to the one or more processors;
an assignment module stored in the memory and configured to store a first device identifier associated with a first portable electronic device, a second device identifier associated with a second portable electronic device, and an entity identifier associated with an entity such that the first device identifier and the second device identifier are stored with a first relationship between the first device identifier and the entity identifier and a second relationship between the second device identifier and the entity identifier;

a device interface module stored in the memory and configured to receive an indication of an activation event; and an activation module stored in the memory and configured to identify the first portable electronic device and the second portable electronic device using the entity identifier and the stored relationships between the entity identifier and the first device identifier and the second device identifier, respectively, and to thereby transmit an activation signal using the entity identifier to activate both the first portable electronic device and the second portable electronic device in accordance with the device interface module detecting the activation event.

21. The system as recited in claim 20, further comprising a tag reader configured to read the first device identifier from the first portable electronic device and the second device identifier from the second portable electronic device.

22. The system as recited in claim 20, wherein the assignment module is further configured to remove the association of the first device identifier and the second device identifier from the entity identifier.

23. A system, comprising:
a database that stores, in mutual association:
metadata that includes:
a first device identifier that identifies a first portable electronic device;
a second device identifier that identifies a second portable electronic device;
data assets captured by the first portable electronic device and the second portable electronic device; and
an entity identifier that identifies a group of portable electronic devices that are associated with the first portable electronic device; and
a user interface configured to enable a user to identify from the metadata an activation event associated with a member of the group identified by the entity identifier, and to search the database to find all devices in the group associated with the metadata.

* * * * *